United States Patent [19]

Barraclough et al.

[11] Patent Number: 5,539,741
[45] Date of Patent: Jul. 23, 1996

[54] AUDIO CONFERENCEING SYSTEM

[75] Inventors: Keith Barraclough, Fremont, Calif.; Peter R. Cripps, Southampton; Adrian Gay, Fareham, both of United Kingdom

[73] Assignee: IBM Corporation, Armonk, N.Y.

[21] Appl. No.: 346,553

[22] Filed: Nov. 29, 1994

[30] Foreign Application Priority Data

Dec. 18, 1993 [GB] United Kingdom ............... 9325924

[51] Int. Cl.$^6$ ............................................... H04Q 11/04
[52] U.S. Cl. ........................ 370/62; 370/110.1; 379/202; 348/15
[58] Field of Search ................................. 370/62, 58.1, 61, 370/112, 119, 110.1; 379/201, 202, 205, 88, 157, 158, 165, 203, 93, 94, 96; 348/14, 13, 15

[56] References Cited

U.S. PATENT DOCUMENTS

| | | | |
|---|---|---|---|
| 4,389,720 | 6/1983 | Baxter et al. | 370/62 |
| 4,730,306 | 3/1988 | Uchida | 379/202 X |
| 4,750,166 | 6/1988 | Illman et al. | 370/62 |
| 4,953,159 | 8/1990 | Hayden et al. | 370/62 |
| 5,014,267 | 5/1991 | Tompkins et al. | 370/62 |
| 5,127,001 | 6/1992 | Steagall et al. | 379/202 X |
| 5,375,068 | 12/1994 | Palmer et al. | 370/62 |
| 5,379,280 | 1/1995 | Cotton et al. | 370/62 |
| 5,402,418 | 3/1995 | Shibata et al. | 370/62 |

FOREIGN PATENT DOCUMENTS 2207581  7/1987  United Kingdom .

Primary Examiner—Alphus H. Hsu
Assistant Examiner—Ricky Q. Ngo
Attorney, Agent, or Firm—Jeanine S. Ray-Yarletts

[57] ABSTRACT

A computer workstation receives multiple audio input streams over a network in an audio conference. The audio input streams are kept separate by storing them in different queues. Digital samples from each of the queues are transferred to an audio adapter card 28 for output. A digital signal processor 46 on the audio adapter card multiplies each audio stream by its own weighting parameter, before summing the audio streams together for output. Thus the relative volume of each of the audio output streams can be controlled. For each block of audio data, the volume is calculated and displayed to the user, allowing the user to see the volume in each audio input stream independently. The user is also provided with volume control for each audio input stream, which effectively adjusts the weighting parameter, thereby allowing the user to alter the relative volumes of each speaker in the conference.

10 Claims, 4 Drawing Sheets

AUDIO CONFERENCEING SYSTEM

BACKGROUND OF THE INVENTION

1. Field of the Invention

The present invention relates to the processing by a computer workstation of multiple streams of audio data received over a network.

2. Description of the Prior Art

Conventionally voice signals have been transmitted over standard analog telephone lines. However, with the increase in locations provided with local area networks (LANs) and the growing importance of multimedia communications, there has been considerable interest in the use of LANs to carry voice signals. This work is described, for example in "Using Local Area Networks for Carrying Online Voice" by D. Cohen, pages 13–21 and "Voice Transmission over an Ethernet Backbone" by P. Ravasio, R, Marcogliese, and R. Novarese, pages 39–65, both in "Local Computer Networks" (edited by P. Ravasio, G. Hopkins, and N. Naffah; North Holland, 1982). The basic principles of such a scheme are that a first terminal or workstation digitally samples a voice input signal at a regular rate (e.g. 8 kHz). A number of samples are then assembled into a data packet for transmission over the network to a second terminal, which then feeds the samples to a loudspeaker or equivalent device for playout, again at a constant rate.

One of the problems with using a LAN to carry voice data is that the transmission time across the network is variable. Thus the arrival of packets at a destination node is both delayed and irregular. If the packets were played out in irregular fashion, this would have an extremely adverse effect on intelligibility of the voice signal. Therefore, voice over LAN schemes utilize some degree of buffering at the reception end, to absorb such irregularities. Care must be taken to avoid introducing too large a delay between the original voice signal and the audio output at the destination end, which would render natural interactive two-way conversation difficult (in the same way that an excessive delay on a transatlantic conventional phone call can be highly intrusive). A system is described in "Adaptive Audio Playout Algorithm for Shared Packet Networks", by B. Aldred, R. Bowater, and S. Woodman, IBM Technical Disclosure Bulletin, pp. 255–257, Vol. 36, No. 4, April 1993 in which packets that arrive later than a maximum allowed value are discarded. The amount of buffering is adaptively controlled depending on the number of discarded packets (any other appropriate measure of lateness could be used). If the number of discarded packets is high, the degree of buffering is increased, while if the number of discarded packets is low, the degree of buffering is decreased. The size of the buffer is altered by temporarily changing the play-out rate (this affects the pitch; a less noticeable technique would be to detect periods of silence and artificially increase or decrease them as appropriate).

Another important aspect of audio communications is conferencing involving multipoint communications, as opposed to two-way or point-to-point communications. When implemented over traditional analog telephone lines, audio conferencing requires each participant to send an audio signal to a central hub. The central hub mixes the incoming signals, possibly adjusting for the different levels, and sends each participant a summation of the signals from all the other participants (excluding the signal from that particular node). U.S. Pat. No. 4,650,929 discloses a centralized video/audio conferencing system in which individuals can adjust the relative volumes of the other participants. U.S. Pat. No. 4,389,720 discloses a telephone conferencing system with individual gain adjustment performed by system ports for multiple end user stations.

The use of a centralized mixing node, often referred to as a multipoint control unit (MCU), has been carried over into some multimedia (audio plus video) workstation conferencing systems. For example, U.S. Pat. No. 4,710,917 describes a multimedia conferencing system, in which each participant transmits audio to and receives audio from a central mixing unit. Other multimedia conferencing systems are described in "Distributed Multiparty Desktop Conferencing System: MERMAID" by K. Watabe, S. Sakata, K. Maeno, H. Fukuoka, and T. Ohmori, pp. 27–38 in CSCW '90 (Proceedings of the Conference on Computer-Supported Cooperative Work, 1990, Los Angeles) and "Personal Multimedia Multipoint Communications Services for Broadband Networks" by E. Addeo, A. Gelman and A. Dayao, pp. 53–57 in Vol. 1, IEEE GLOBECOM, 1988.

The use of a centralized MCU or summation node however has several drawbacks. Firstly, the architecture of most LANs is based on a peer-to-peer arrangement, and so there is no obvious central node. Moreover, the system relies totally on the continued availability of the nominated central node to operate the conference. There can also be problems with echo suppression (the central node must be careful not to include the audio from a node in the summation signal played back to that node).

These problems can be avoided by the use of a distributed audio conferencing system, in which each node receives a separate audio signal from every other node in the conference. U.S. Pat. No. 5,127,001 describes such a distributed system, and discusses the synchronisation problems that arise because of the variable transit time of packets across the network. U.S. Pat. No. 5,127,001 overcomes this problem by maintaining separate queues of incoming audio packets from each source node. These effectively absorb the jitter in arrival time in the same way as described above for simple point-to-point communications. At regular intervals a set of audio packets are read out, one packet from each of the queues, and summed together for playout. In U.S. Pat. No. 5,127,001 the audio contributions from the different parties are combined using a weighted sum. A somewhat similar approach is found in GB 2207581, which describes a rather specialized local area network for the communication of digital audio in aircraft. This system includes means for adjusting independently the gain of each audio channel using a store of predetermined gain coefficients.

One of the problems in audio conferencing systems, as discovered with the MERMAID system referred to above, is determining who is speaking at any given moment. U.S. Pat. No. 4,893,326 describes a multimedia conferencing system, in which each workstation automatically detects if its user is speaking. This information is then fed through to a central control node, which switches the video so that each participant sees the current speaker on their screen. Such a system requires both a video and audio capability to operate, and furthermore relies on the central video switching node, so that it cannot be used in a fully distributed system.

A distributed multimedia conferencing system is described in "Personal Multimedia-Multipoint Teleconference System" by H. Tanigawa, T. Arikawa, S. Masaki, and K. Shimamura, pp. 1127–1134 in IEEE INFOCOM 91, Proceedings Vol 3. This system provides sound localization for a stereo workstation, in that as a window containing the video signal from a conference participant is moved from right to left across the screen, the apparent source of the corresponding audio signal moves likewise. This approach provides limited assistance in identification of a speaker. A more comprehensive facility is described in Japanese abstract JP 02-123886 in which a bar graph is used to depict the output voice level associated with an adjacent window containing a video of the source of the sound.

The prior art therefore describes a variety of audio conferencing systems. While conventional centralized telephone audio conferencing is both widespead and well understood from a technological point of view, much work remains to be done to increase the performance of audio conferencing implementations in the desk-top environment.

SUMMARY OF THE INVENTION

Accordingly the invention provides a computer workstation for connecting to a network and receiving multiple audio input streams from the network, each audio stream comprising a sequence of digital audio samples, the workstation including:

means for storing the digital audio samples from each audio input stream in a separate queue;

means for forming a sequence of sets containing one digital audio sample from each queue;

means for producing a weighted sum for each set of digital audio samples, each audio input stream having a weighting parameter associated therewith;

means for generating an audio output from the sequence of weighted sums;

and characterized by means responsive to user input for adjusting said weighting parameters to control the relative volumes within the audio output of the multiple audio streams.

The invention recognizes that the provision of audio conferencing over a distributed network, in which each node receives a separate audio stream from all of the other participants, naturally allows extra functionality that could only previously be achieved with great difficulty and expense in in centralized conferencing systems. In particular, each user can adjust the relative volume of all the other participants according to their own personal preferences. This can be very desirable for example if they need to focus on one particular aspect of the conference, or because of language problems (for example, maybe one person has a strong accent which is difficult for some people to understand, or maybe the conference involves simultaneous translation). Moreover, even during the conference the system is responsive to user input to alter the relative volumes of the different participants. In order to permit this control, the incoming audio signals are kept separate, being placed into different queues according to their source (the queues are logically separate storage, although physically they may be adjacent or combined), before being weighted by the appropriate volume control factor. Only then are they combined together to produce the final audio output. The invention thus recognizes that a distributed audio conferencing system is particularly suited to the provision of individual control for the relative volumes.

Preferably the workstation further comprises means for providing a visual indication for each of said multiple audio input streams of whether or not that stream is currently silent. This overcomes one of the recognized problems in audio conferencing, determining who is speaking. The visual indication may simply be some form of on/off indicator, such as a light or equivalent feature, but in a preferred embodiment is implemented by a display that indicates for each of said multiple audio input streams the instantaneous sound volume in that audio stream. In other words, the display provides a full indication of the volume of the relevant participant. The volume output can be calculated on the basis of a running root-mean-square value from the sequence of digital audio samples, or if processing power is limited a simpler algorithm may be employed, such as using the maximum digital audio value in a predetermined number of samples. In general the incoming audio data arrives in blocks, each containing a predetermined number of digital audio samples, and said visual indication is updated for each new block of audio data. Thus the volume figure will typically be calculated on a per block basis.

It is also preferred that said visual indication is displayed adjacent a visual representation of the origin of that audio input stream, such as a video or still image. The former requires a full multimedia conferencing network, whereas the latter can be provided on much lower bandwidth networks which cannot support the transmission of video signals. Such a visual indication, whether still or moving, allows easy identification of the source of any audio.

Preferably the workstation further includes means for providing the user with a visual indication of the values of said weighting parameters, said means being responsive to user mouse operations to adjust said weighting parameters. This can be implemented as a scroll-bar or the like, one for each audio input stream, and located adjacent the visual indication of output volume for that stream. It is also convenient for the computer workstation to further comprise means for disabling audio output from any of said multiple audio input streams. Thus the user is effectively provided with a full set of volume controls for each audio input stream.

The invention also provides a method of operating a computer workstation, connected to a network for the receipt of multiple audio input streams, each audio stream comprising a sequence of digital audio samples, said method comprising the steps of:

storing the digital audio samples from each audio input stream in a separate queue;

forming a sequence of sets containing one digital audio sample from each queue;

producing a weighted sum for each set of digital audio samples, each audio input stream having a weighting parameter associated therewith;

generating an audio output from the sequence of weighted sums;

and characterized by adjusting responsive to user input said weighting parameters to control the relative volumes within the audio output of the multiple audio streams.

BRIEF DESCRIPTION OF THE DRAWING

An embodiment of the invention will now be described by way of example with reference to the following drawings.

DETAILED DESCRIPTION OF THE PREFERRED EMBODIMENT(S)

Figure 1:
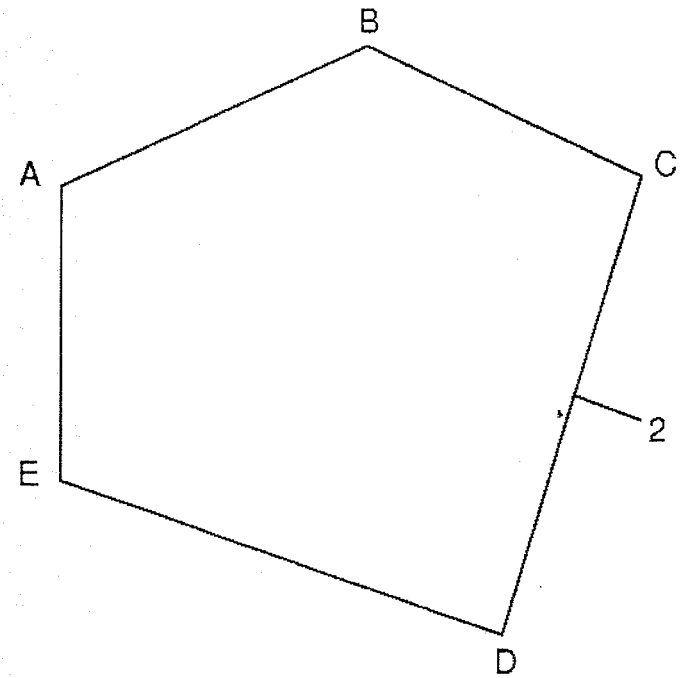
FIG. 1 is a schematic diagram of a computer network.

FIG. 1 is a schematic diagram of computer workstations A–E linked together in a local area network (LAN) 2. These workstations are participating in a multiway conference, whereby each workstation is broadcasting its audio signal to all the other workstations in the conference. Thus each workstation receives a separate audio signal from every other workstation. The network shown in FIG. 1 has a Token Ring architecture, in which a token circulates around the workstations. Only the workstation currently in possession of the token is allowed to transmit a message to another workstation. It should be understood that the physical transmission time for a message around the ring is extremely short. In other words, a message transmitted by A for example is received by the all the other terminals almost simultaneously. This is why a token system is used to prevent interference arising from two nodes trying to transmit messages at the same time.

As described in more detail below, a one-way audio communication on a LAN typically requires a bandwidth of 64 kHz. In the conference of FIG. 1, each node will be broadcasting its audio signal to four other nodes, implying all overall bandwidth requirement of 5×4×64 kHz (1.28 MHz). This is comfortably within the capability of a standard Token Ring, which supports either 4 or 16 MBits per second transmission rate. It will be recognized that for larger conferences the bandwidth requirements quickly become problematic, although future networks are expected to offer much higher bandwidths.

Note that the invention can be implemented on many different network architectures or configurations other than Token Ring, providing of course the technical requirements regarding bandwidth, latency and so on necessary to support audio conferencing can be satisfied.

Figure 2:
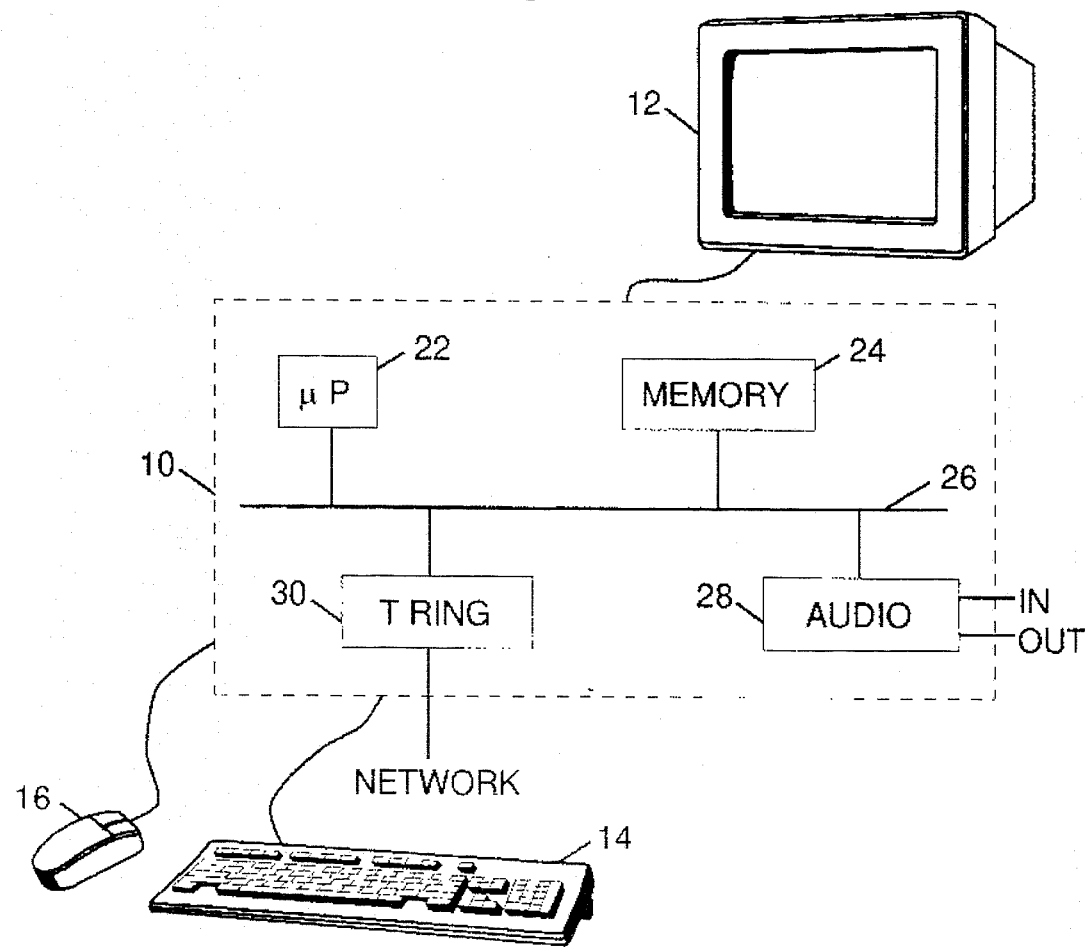
FIG. 2 is a simplified block diagram of a computer workstation for use in audio conferencing.

FIG. 2 is a simplified schematic diagram of a computer system which may be used in the network of FIG. 1. The computer has a system unit 10, a display screen 12, a keyboard 14 and a mouse 16. The system unit 10 includes microprocessor 22, semi-conductor memory (ROM/RAM) 24, and a bus over which data is transferred 26. The computer of FIG. 2 may be any conventional workstation, such as an IBM PS/2® computer.

The computer of FIG. 2 is equipped with two adapter cards. The first of these is a Token Ring adapter card 30. This card, together with accompanying software, allows messages to be transmitted onto and received from the Token Ring network shown in FIG. 1. The operation of the Token Ring card is well-known, and so will not be described in detail. The second card is an audio card 28 which is connected to a microphone and a loudspeaker (not shown) for audio input and output respectively.

Figure 3:
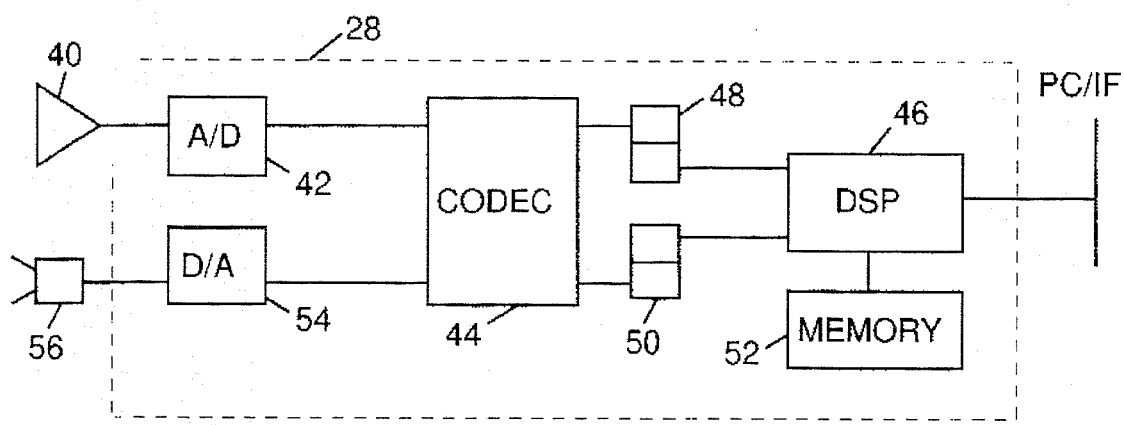
FIG. 3 is a simplified block diagram of an audio adapter card in the computer workstation of FIG. 2.

The audio card is shown in more detail in FIG. 3. The card illustrated and used in this particular embodiment is an M-Wave card available from IBM, although other cards are available that perform an analogous function. ("M-Wave" is a trademark of IBM Corporation.) The card contains an A/D converter 42 to digitized incoming audio signals from an attached microphone 40. The A/D converter is attached to a CODEC 44, which samples the incoming audio signal at a rate of 44.1 kHz into 16 bit samples (corresponding to the standard sampling rate/size for compact disks). Digitized samples are then passed to a digital signal processor (DSP) 46 on the card via a double buffer 48 (ie the CODEC loads a sample into one half of the double buffer while the CODEC reads the previous sample from the other half). The DSP is controlled by one or more programs stored in semiconductor memory 52 on the card. Data can be transferred by the DSP to and from the main PC bus.

Audio signals to be played out are received by the DSP 46 from the PC bus 26, and processed in a converse fashion to audio input from the microphone. That is, the output audio signals are passed through the DSP 46 and a double buffer 50 to the CODEC 44, from there to a D/A converter 54, and finally to a loudspeaker 56 or other appropriate output device.

In the particular embodiment shown, the DSP is programmed to transform samples from the CODEC from 16 bits at 44.1 kHz into a new digital signal having an 8 kHz sampling rate, with 8-bit samples on a μ-law scale (essentially logarithmic), corresponding to CCITT standard G.711, using standard re-sampling techniques. The total bandwidth of the signal passed to the workstation for transmission to other terminals is therefore 64 kHz. The DSP also performs the opposite conversion on an incoming signal received from the PC, i.e. it converts the signal from 8-bit 8 kHz to 16-bit, 44.1 kHz, again using known re-sampling techniques. Note that this conversion between the two sampling formats is only necessary because of the particular choice of hardware, and has no direct bearing on the invention. Thus for example, many other audio cards include native support for the 8 kHz format, i.e. the CODEC can operate according to G.711 format thereby using the 8 kHz format throughout (alternatively the 44.1 kHz samples retained for transmission over the network, although the much higher bandwidth and greatly increased processing speed required render this unlikely unless there is a particular need for the transmitted audio signal to be of CD quality; for normal voice communications the 64 kHz bandwidth signal of the G.711 format is adequate).

Data is transferred between the audio adapter card and the workstation in blocks of 64 bytes: i.e. 8 ms of audio data, for 8-bit data sampled at 8 kHz. The workstation then only processes whole blocks of data, and each data packet transmitted from or received by the workstation typically contains a single 64 byte block of data. The choice of 64 bytes for the block size is a compromise between minimizing the granularity of the system (which introduces delay), whilst maintaining efficiency both as regards internal processing in the workstation and transmission over the network. In other systems a block size of 32 or 128 bytes for example may be more appropriate.

The operation of a computer workstation as regards the transmission of audio data is well-known in the prior art, and so will not be described in detail. Essentially, the audio card receives an input signal, whether in analogue form from a microphone, or from some other audio source, such as a compact disk player, and produces blocks of digital audio data. These blocks are then transferred into the main memory of the workstation, and from there to the LAN adapter card (in some architectures it may be possible to transfer blocks from the audio adapter card directly into the LAN adapter card, without the need to go via the workstation memory). The LAN adapter card generates a data packet containing the digital audio data along with header information, identifying the source and destination nodes, and this packet is then transmitted over the network to the desired recipient(s). It will be understood that in any two or multi-way communications this transmission process will be executing at the workstation simultaneously with the reception process described below.

Figure 4:
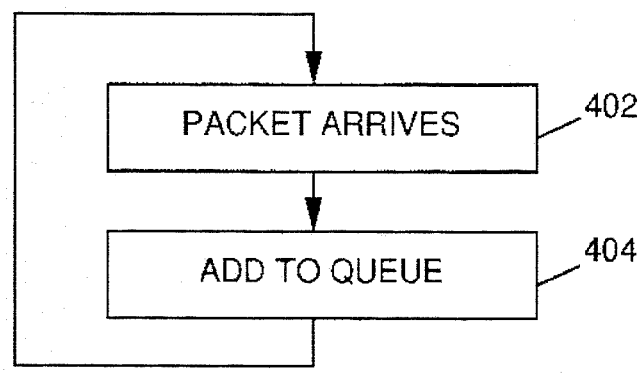
FIG. 4 is a flow chart illustrating the processing performed on an incoming audio packet.
Figure 5:
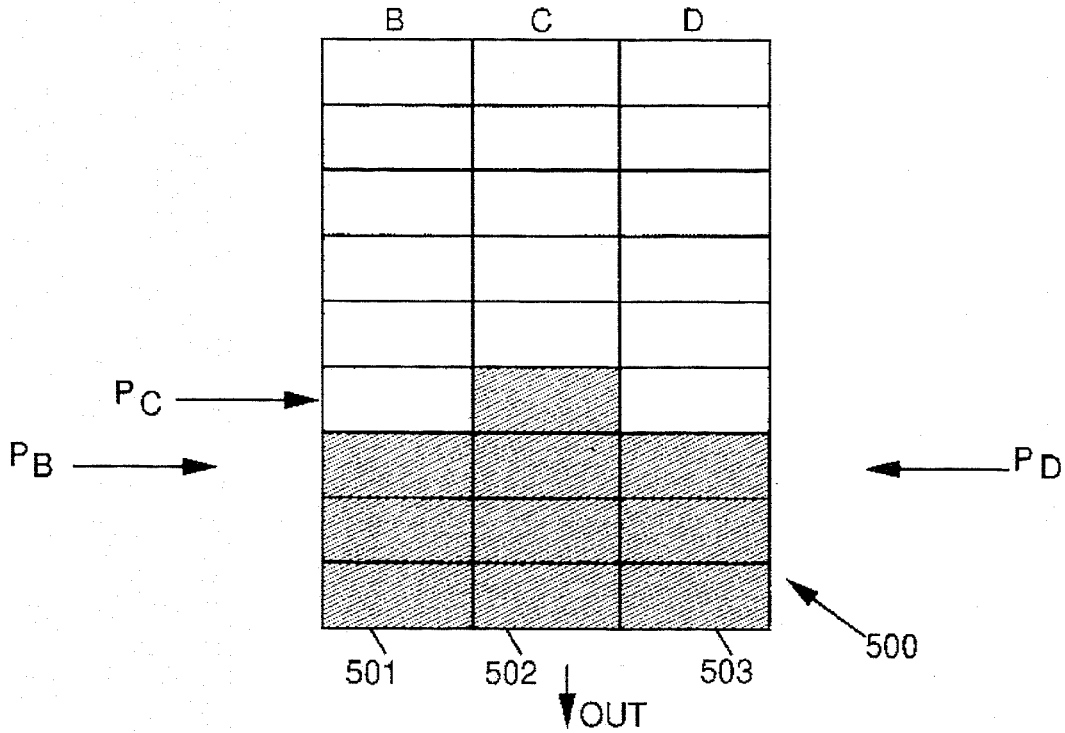
FIG. 5 illustrates the queue of incoming audio packets waiting to be played out.

The processing by the computer workstation as regards the reception of audio data packets is illustrated in FIG. 4. Whenever a new packet arrives (step 402), the LAN adapter card notifies a program executing on the microprocessor in the workstation, providing information to the program identifying the source of the data packet. The program then transfers the incoming 64 byte audio block into a queue in main memory (step 404). As shown in FIG. 5, the queue in main memory 500 actually comprises a set of separate subqueues containing audio blocks from each of the different source nodes. Thus one queue contains the audio blocks from one source node, one queue contains the audio blocks from another source node, and so on. In FIG. 5 there are three subqueues 501, 502, 503, for audio data from nodes B, C and D respectively; the number of subqueues will of course vary with the number of participants in the audio conference. The program uses the information in each received packet identifying the source node in order to allocate the block of incoming audio data to the correct queue. Pointers $P_B$, $P_C$, and $P_D$ indicate time position of the end of the queue and are updated whenever new packets are added. Packets are removed for further processing from the bottom of the subqueues ("OUT" as shown in FIG. 5). The subqueues in FIG. 5 are therefore essentially standard First In First Out queues and can be implemented using conventional programming techniques. Note that apart from the support of multiple (parallel) queues, the processing of incoming audio blocks as described so far is exactly analogous to prior art methods, allowing equivalent buffering techniques to be used if desired, either with respect to individual subqueues, or on the combined queue in its entirety.

Figure 6:
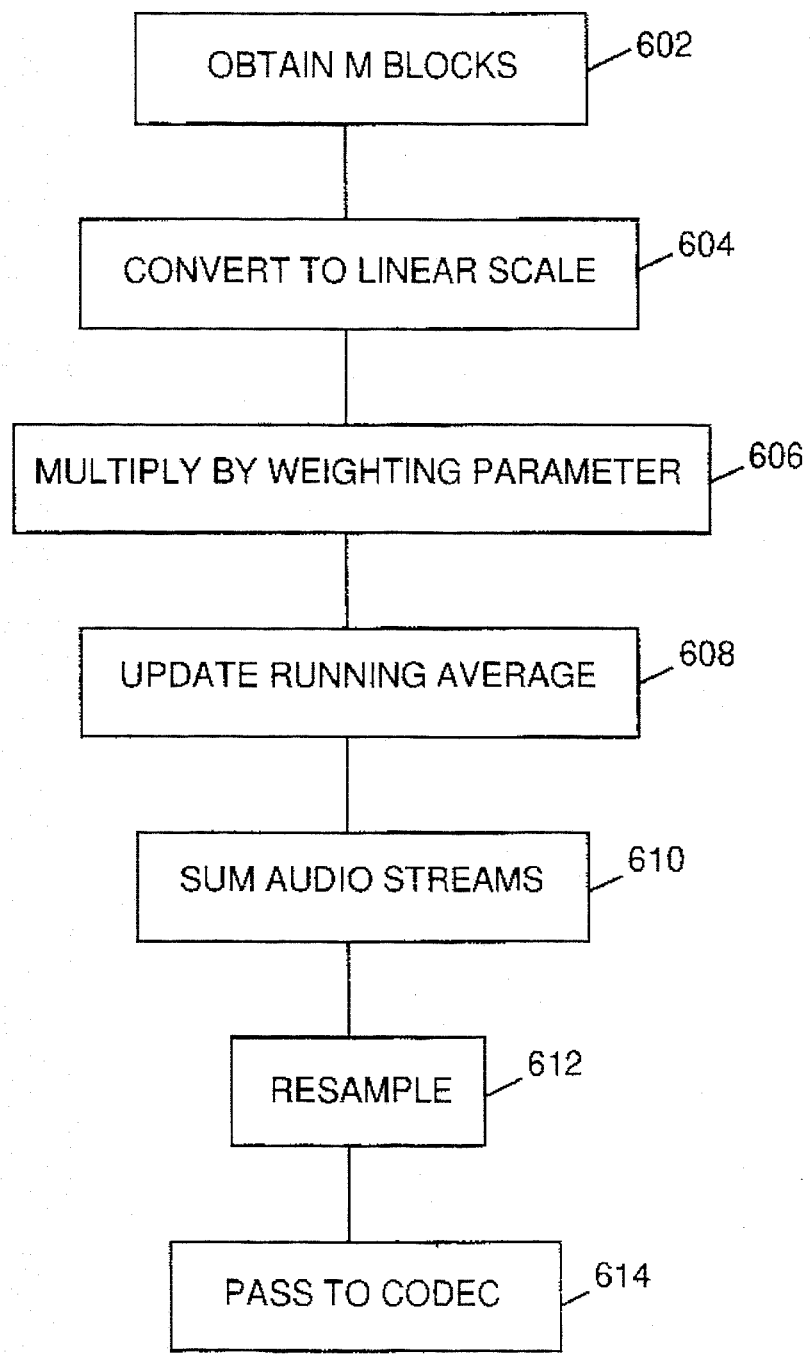
FIG. 6 is a flow chart illustrating the processing performed by the digital signal processor on the audio adapter card.

The operations performed by the DSP on the audio adapter card are illustrated in FIG. 6. The DSP runs in a cycle, processing a fresh set of audio blocks every 8 milliseconds in order to ensure a continuous audio output signal. Thus every 8 ms the DSP uses DMA access to read out one audio block from each of the subqueues corresponding to the different nodes—i.e. one block from the bottom of queues B, C, and D as shown in FIG. 5 (step 602: i.e. M=3 in this case). These blocks are treated as representing simultaneous time intervals: in the final output they will be added together to produce a single audio output for that time interval. The DSP therefore effectively performs a digital mixing function on the multiple audio input streams. Using a look-up table, the individual samples within the 64 byte blocks are then converted out of G.711 format (which is essentially logarithmic) into a linear scale (step 604). Each individual sample is then multiplied by a weighting parameter (step 606). There is a separate weighting parameter for each received audio data stream; i.e. for the three subqueues of FIG. 5, there is one weighting parameter for the audio stream from node B, one for the audio stream from node C, and one for the audio stream from node D. The weighting parameters are used to control the relative loudness of the audio signals from different sources.

The DSP maintains a running record of the root mean square (rms) value for each audio stream (step 608). Typically such an rms value is produced for each block of audio data (i.e. every 8 milliseconds) by generating the sum and sum of squares of the values within that block. The rms value represents the volume of that individual audio input stream and is used to provide volume information to the user as described below.

Once the digital audio samples have been multiplied by the appropriate weighting parameter, they are summed together (step 608; note that this can effectively happen in parallel to the processing of step 606). Thus a single sequence of digital audio samples is produced, representing the weighted sum of the multiple input audio streams. This sequence of digital audio samples is then re-sampled up to 44.1 kHz (step 610, although as mentioned previously, this is hardware-dependent and not directly relevant to the present invention), before being passed to the CODEC (step 612) for supply to the loudspeaker.

Note that the actual DSP processing used to generate the volume adjusted signals may vary somewhat from that shown in FIG. 6, although effectively the end result is similar. Such variations might typically be introduced to maximise computational efficiency or to reduce demands on the DSP. For instance, if processor power is limited, then the volume control can be implemented at the conversion out of μ-law format. Thus after the correct look-up value has been located (step 604), the actual read-out value can be determined by moving up or down the table a predetermined number of places, according to whether the volume of the signal is to be increased or decreased from its normal value. In this case the weighting parameter is effectively the number of steps up or down to adjust the look-up table (obviously allowing for the fact that the G.711 format separates the original amplitudes according to whether they are positive or negative, and volume adjustment cannot convert one into the other). The above approach is computationally simple, but provides only discrete rather than continuous volume control. Alternatively it would be possible to add the logarithm of the volume control value or weighting parameter to the μ-law figure. This approach effectively performs the multiplication of step 606 prior to the scale conversion of step 604 using logarithmic addition, which for most processors is computationally less expensive than multiplication. The result can then be converted back into a linear scale (step 604) for mixing with the other audio streams. This approach does permit fine volume control providing the look-up table is sufficiently detailed (although note that time output remains limited to 16 bits). Typically the logarithm of the weighting parameter could be obtained from a look-up table, or alternatively could be supplied already in logarithmic form by the controlling application. Of course, it is only necessary to calculate a new logarithmic value when the volume control is adjusted, which is likely to be relatively infrequently.

Similarly, if the available processing power was insufficient to perform a continuous rms volume measurement, then the processing might perhaps be performed on every other block of data, or alternatively some computationally simpler algorithm such as summing the absolute value of the difference between successive samples could be used. Note that the summation of the squared values can be performed by logarithmic addition prior to step 604 (i.e. before the scale conversion). An even simpler approach would be to simply use the maximum sample value in any audio block as a volume indicator.

Figure 7:
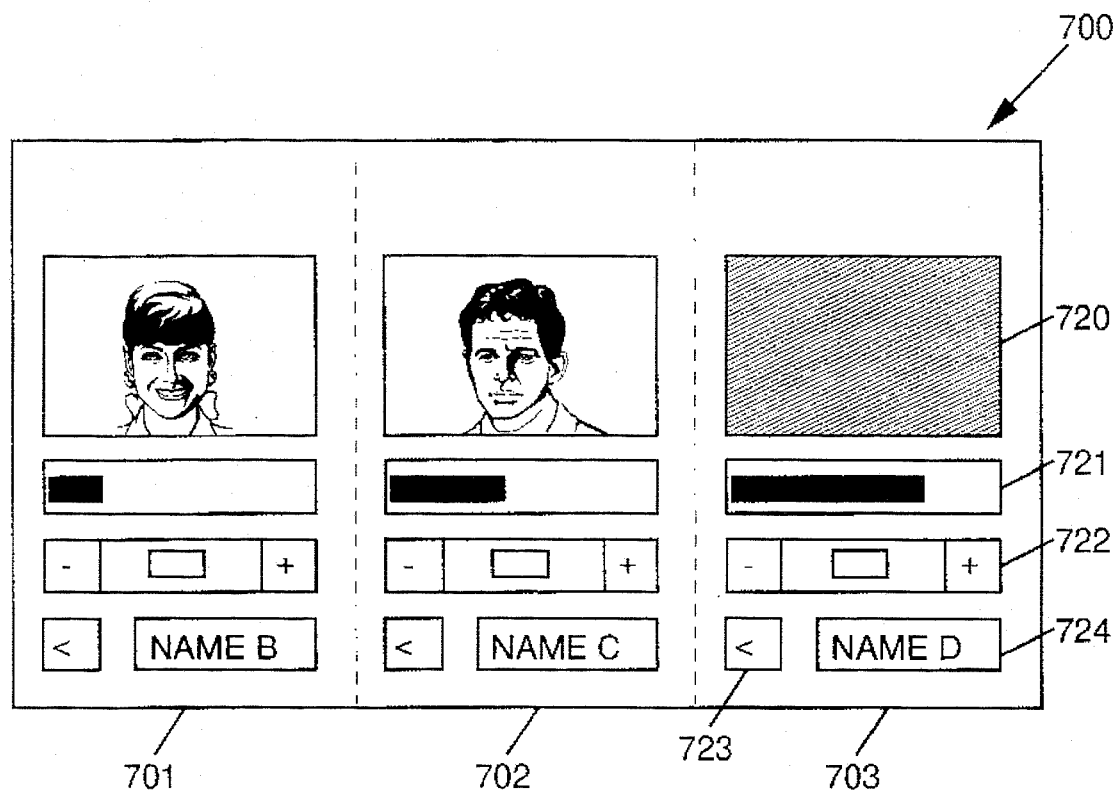
FIG. 7 shows a typical screen interface presented to the user of the workstation of FIG. 2.

FIG. 7 shows the screen 700 presented to the user at the workstation who is involved in an audio conference. As in the previous discussion, this involves the receipt of three different streams of audio data, although obviously the invention is not limited to just three participants. The screen in FIG. 7 has been split by dotted lines into three areas 701, 702, 703, each representing one participant, although in practice these dotted lines do not appear on the screen. Associated with each participant is a box 724 containing the name of the participant (in our case simply B, C and D). There is also an image window 720 which can be used to contain a video image of the audio source, transmitted over the network with the audio, or a still bit map (either supplied by the audio source at the start of time conference, or perhaps already existing locally at the workstation and displayed in response to the name of that participant). In the case of participant D, no video or still image is available, so a blank window is shown. The choice of display (blank, still or video image) in the image window will depend on the available hardware at that workstation, the bandwidth of the network, and the availability of the relevant information.

Beneath the image window is a volume display 721 (a VU meter) which indicates the instantaneous volume of that audio stream (as calculated in block 608 in FIG. 6). The length of the solid line in this display depicts the volume of the audio stream. If there is no audio signal from that participant, then the solid line has zero length (i.e. it disappears). The user can therefore determine who is speaking in a conference by looking at whose VU meter is active.

Beneath the volume display is a volume control bar 722, which allows the user to adjust the relative volume of that participant. This is performed by the user pressing on the "+" or "−" buttons at either end of the bar in order to increase or decrease the volume respectively. This has the effect of correspondingly increasing or decreasing the weighting parameter used in the digital mixing. The indicator in the middle of the volume control bar represents the current volume setting (ie the current value of the weighting parameter).

Finally, next to the name box 724 is a mute button 723. Pressing this button toggles between disabling and enabling the audio output from that participant. When the audio output is disabled the weighting parameter is set to zero, when it is enabled the weighting parameter is restored to its previous value (i.e. as indicated on the volume control bar). If the audio from a participant is currently disabled, this is indicated by a cross superimposed over the mute button (in FIG. 7 all three audio outputs are currently enabled). Note that using the DSP processing described above, when the mute button is on with the audio output disabled, the VU meter will show zero. If desired it would be straightforward to modify the system so that the VU meter instead showed the signal level that would be produced if the audio output was in fact enabled.

Figure 8:
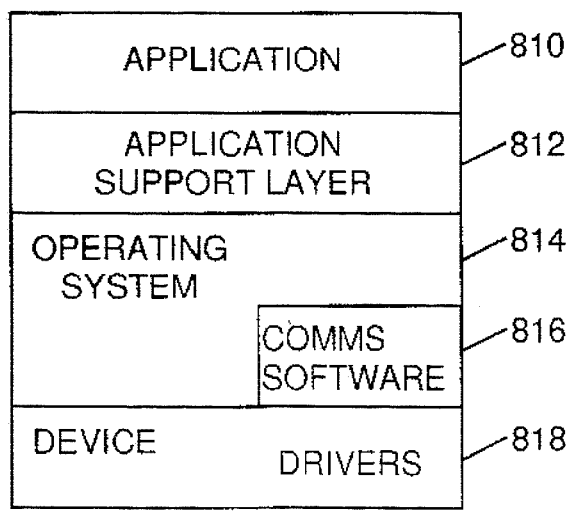
FIG. 8 is a simplified diagram showing the main software components running on the workstation of FIG. 2.

FIG. 8 illustrates the main software components running on the workstation of FIG. 2 in order to provide the user interface of FIG. 7. The workstation is controlled by the operating system 814, such as Windows, available from Microsoft Corporation. Also present on the workstation is the appropriate communications software 816 to enable LAN communications (in some cases the communications software may effectively be included in the operating system). The operating system and communications software interact with the two adapter cards, the Token Ring and audio adapter cards, via device drivers 818, as is well-known in the art. The overall processing of the audio is controlled by the application 810. This utilizes the functions of an Application Support Layer 812, which in one implementation is Visual Basic, available from Microsoft Corporation. The purpose of the Application Support Layer is to facilitate the development of the application, particularly as regards the user interface, but of course it would be possible for the application to work directly with the operating system instead.

The application controls the contents of the window boxes 720 in accordance with known programming techniques. For example, the VU meters 721 are provided using functions provided in Visual Basic, which is effectively responsible for all the graphics associated with the meters: all that is necessary for the application to do is to supply the relevant numerical values. Since Visual Basic is interrupt-driven, this is easily accomplished by the DSP copying the output volume for an audio block into a workstation, and then invoking an interrupt. The interrupt produces an event in the application, notifying it of the new output volume which can now be copied onto the VU meter. In fact, the interrupt is used to signal the availability of the complete set of volume readings for that set of audio blocks; i.e. one volume reading for each audio stream (note that the DSP already executes an interrupt per audio block in relation to the outgoing audio signal produced at that workstation for transmission over the network). Likewise the volume control bar 722 is also a feature provided in Visual Basic (termed a "scroll bar"). Visual Basic is responsible for all the graphics associated with the control bar, including the position of the selector, and simply passes to the application an updated volume figure whenever this is adjusted by the user. The application can then write this updated figure into the DSP to alter the volume accordingly. The mute button 723 is another display feature provide by Visual Basic allowing simple on/off control of each audio stream. Note that whenever the mute button is activated it is necessary for the application to remember tire previous value of the weighting parameter, so that this can be restored when the mute button is next pressed.

It should be appreciated that many variations on the above user interface are possible. For example, the VU meter could be segmented, or replaced by an analog level meter. An even simpler approach would be an on/off indicator that just changed colour according to whether or not there was any audio output from that participant. The volume control function could be implemented using a dial, or perhaps with a drag and drop slider rather than two push-buttons. The mute button could also be incorporated into the volume control bar. Such variations are well within the programming capabilities of the person skilled in the art.

Although in the system described above the user is effectively limited to volume control of each audio input stream, in other systems the user may be provided with more advanced controls such as frequency control (i.e. treble and base adjustment), This could be implemented relatively easily by the DSP multiplying the audio signal in the time domain by an FIR or IIR filter. The frequency control would be represented to the user in a manner similar to the volume control bar of FIG. 7, and changes to the frequency control would produce appropriate changes to the FIR/IIR filter coefficients. These advanced controls will become increasingly desirable as the quality of audio signals transmitted over networks improves, for example in systems that use the G.721 rather than G.711 audio transmission standard.

What is claimed is:

1. A computer workstation for connecting to a network and for playing out multiple audio input streams received from the network, wherein each audio stream comprises a sequence of digital audio samples and has a weighting parameter associated therewith, the weighting parameter representing the volume with which the associated audio stream is played out, the workstation including:

means for storing the digital audio samples from each audio input stream received from the network in a separate queue;

means for forming a sequence of sets, each set containing one digital audio sample from each audio input stream;

means for weighting each digital audio sample in a set in accordance with the weighting parameter associated with the audio stream from which the audio sample originated;

means for producing a sum from each set of weighted digital audio samples;

means for generating an audio output from the sequence of sums of weighted digital audio samples;

and means responsive to user input at the workstation for adjusting said weighting parameters to control the relative volumes within the audio output of the multiple audio streams.

2. A computer workstation as claimed in claim 1, further comprising means for providing a visual indication for each of said multiple audio input streams whether or not that stream is currently silent.

3. A computer workstation as claimed in claim 2, wherein said visual indication further indicates for each of said multiple audio input streams the instantaneous sound volume in that audio stream.

4. A computer workstation as claimed in claims 2 or 3, wherein said visual indication is displayed adjacent a visual representation of the origin of that audio input stream.

5. A computer workstation as claimed in claim 4, further comprising for each of said multiple audio input streams, means for generating a running root-mean-square value from the sequence of digital audio samples therein.

6. A computer workstation as claimed in claim 4, wherein incoming audio data arrives in blocks, each containing a predetermined number of digital audio samples, and said visual indication is updated for each new block of audio data.

7. A computer workstation as claimed in claim 1, 2, or 3, further comprising means for disabling audio output from any of said multiple audio input streams.

8. A computer workstation as claimed in claim 1, 2 or 3, further comprising means for providing the user with a visual indication of the values of said weighting parameters, said means being responsive to user mouse operations to adjust said weighting parameters.

9. A method of operating a computer workstation, connected to a network, to play out multiple audio input streams received from the network, wherein each audio stream comprises a sequence of digital audio samples and has a weighting parameter associated therewith, the weighting parameter representing the volume with which the associated audio stream is played out, said method comprising the steps of:

storing the digital audio samples from each audio input stream received from the network in a separate queue;

forming a sequence of sets, each set containing one digital audio sample from each audio input stream;

weighting each digital audio sample in a set in accordance with the weighting parameter associated with the audio stream from which the audio sample originated;

producing a sum from each set of weighted digital audio samples;

generating an audio output from the sequence of sums of weighted digital audio samples;

and adjusting responsive to user input at the workstation said weighting parameters to control the relative volumes within the audio output of the multiple audio streams.

10. A method of operating a computer workstation as claimed in claim 9, further comprising the step of providing a visual indication for each of said multiple audio input streams of the instantaneous sound volume in that audio stream.

* * * * *